United States Patent
Grieve (10) Patent No.: US 8,484,373 B2
(45) Date of Patent: Jul. 9, 2013

(54) SYSTEM AND METHOD FOR REDIRECTING A REQUEST FOR A NON-CANONICAL WEB PAGE

(75) Inventor: Andrew A. Grieve, Waterloo (CA)

(73) Assignee: Google Inc., Mountain View, CA (US)

( * ) Notice: Subject to any disclaimer, the term of this patent is extended or adjusted under 35 U.S.C. 154(b) by 113 days.

(21) Appl. No.: 12/911,694

(22) Filed: Oct. 25, 2010

(65) Prior Publication Data
US 2012/0102221 A1    Apr. 26, 2012

(51) Int. Cl.
*G06F 15/16* (2006.01)
(52) U.S. Cl.
USPC .......................................... 709/238; 709/227
(58) Field of Classification Search
USPC ................. 709/200–203, 217–227, 238, 245, 709/228
See application file for complete search history.

(56) References Cited

U.S. PATENT DOCUMENTS

| | | | | |
|---|---|---|---|---|
| 5,974,455 A  * | 10/1999 | Monier | | 709/223 |
| 6,032,196 A  * | 2/2000 | Monier | | 709/245 |
| 6,195,707 B1 * | 2/2001 | Minh | | 709/245 |
| 2002/0013810 A1* | 1/2002 | Hwa | | 709/203 |
| 2006/0031404 A1* | 2/2006 | Kassab | | 709/218 |
| 2007/0124414 A1* | 5/2007 | Bedingfield et al. | | 709/217 |
| 2007/0124499 A1* | 5/2007 | Bedingfield et al. | | 709/245 |
| 2007/0124500 A1* | 5/2007 | Bedingfield et al. | | 709/245 |
| 2011/0066710 A1* | 3/2011 | Paul | | 709/222 |

* cited by examiner

*Primary Examiner* — Moustafa M Meky
(74) *Attorney, Agent, or Firm* — Baker & McKenzie LLP (57) ABSTRACT

Disclosed are systems and methods for redirecting a request for a non-canonical web page. In one embodiment, a method includes receiving a request, from a client, for an alias Uniform Resource Locator ("URL") at a web server, where an address for the alias URL is different than an address for a canonical URL, where the alias URL and the canonical URL are associated with the same web resources. The method further includes sending a redirect to the client to request the canonical URL, and sending one or more instructions to the client to request the canonical URL for a subsequent request for the alias URL.

27 Claims, 3 Drawing Sheets

SYSTEM AND METHOD FOR REDIRECTING A REQUEST FOR A NON-CANONICAL WEB PAGE

TECHNICAL FIELD

The principles disclosed herein relate generally to redirecting a web page request, and more particularly to redirecting a request for a non-canonical web page to load the canonical web page from a local cache.

BACKGROUND

When a client requests a web page, each resource associated with the web page is typically transmitted over the network to the client. Certain client applications have attempted to reduce the traffic across the network by storing the resources associated with the web page in memory and loading these resources from memory for future requests of the web page. However, these applications have several drawbacks. For example, these applications will only load a web page from memory if the exact web page address is requested again. However, requests for aliases of the web page must be requested from the network rather than loaded from memory even though the aliases of the web page may include the same resources already stored at the client for the originally requested web page. Thus, any request for an alias of a web page causes an increase in network traffic and increases the amount of time for the web page to load in the client. As a result, the user may have a poor user experience because of the increased time waiting for the alias of the web page to load, especially when using a mobile device. The need has arisen to reduce the network traffic and provide a better user experience for requesting aliases of a web page.

SUMMARY

Disclosed are systems and methods for a request for a web page with a non-canonical URL. In one embodiment, a method includes receiving a request, from a client, for an alias Uniform Resource Locator ("URL") at a web server, where an address for the alias URL is different than an address for a canonical URL, where the alias URL and the canonical URL are associated with the same web resources. The method further includes sending a redirect to the client to request the canonical URL, and sending one or more instructions to the client to request the canonical URL for a subsequent request for the alias URL. The method further comprises determining if the alias URL is likely to be requested again, and sending the one or more instructions only if the alias URL is likely to be requested again. The one or more instructions may include an instruction to store an entry of the alias URL and the redirect to the canonical URL in a cache table, where the cache table stores an entry for one or more resources associated with the canonical URL. Accordingly, the one or more instructions allows the client, in response to subsequently requesting the alias URL, to load the one or more web resources associated with the canonical URL from client memory without communicating with the web server.

In one embodiment, a system is provided for redirecting a request for a non-canonical web page, the system includes a web server. The web server is operable to receive a request, from a client, for an alias Uniform Resource Locator ("URL"), where an address for the alias URL is different than an address for a canonical URL, where the alias URL and the canonical URL are associated with the same web resources. The web server is further operable to send a redirect to the client to request the canonical URL, and send one or more instructions to the client to request the canonical URL for a subsequent request for the alias URL. The web server is further operable to determine if the alias URL is likely to be requested again, and send the one or more instructions only if the alias URL is likely to be requested again. The one or more instructions may include an instruction to store an entry of the alias URL and the redirect to the canonical URL in a cache table, where the cache table stores an entry for one or more resources associated with the canonical URL. Accordingly, the one or more instructions allows the client, in response to subsequently requesting the alias URL, to load the one or more web resources associated with the canonical URL from client memory without communicating with the web server.

The present disclosure provides several important technical advantages. In certain embodiments, the present disclosure maximizes cache hits for resources associated with a web page and prevents multiple copies of the associated resources from being stored in memory. For example, by utilizing client-side redirects of alias URLs to canonical URLs, the present disclosure maximizes cache hits of the resources associated with the canonical URL and alias URLs without having to download separate instances of each resource associated with each alias URL. Thus, in some embodiments, only one instance of each resource associated with a web page needs to be stored in client memory even if the web page has multiple alias URLs. As a result, the user experience is greatly improved, especially for users of mobile clients, by reducing the load time associated with an alias URL request because the client-side redirect to the canonical URL and the retrieval of cache resources associated with the alias URL from client memory may occur without having to communicate across the network with a web server. Thus, a browser may load an alias URL even if the client is not connected to the network.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
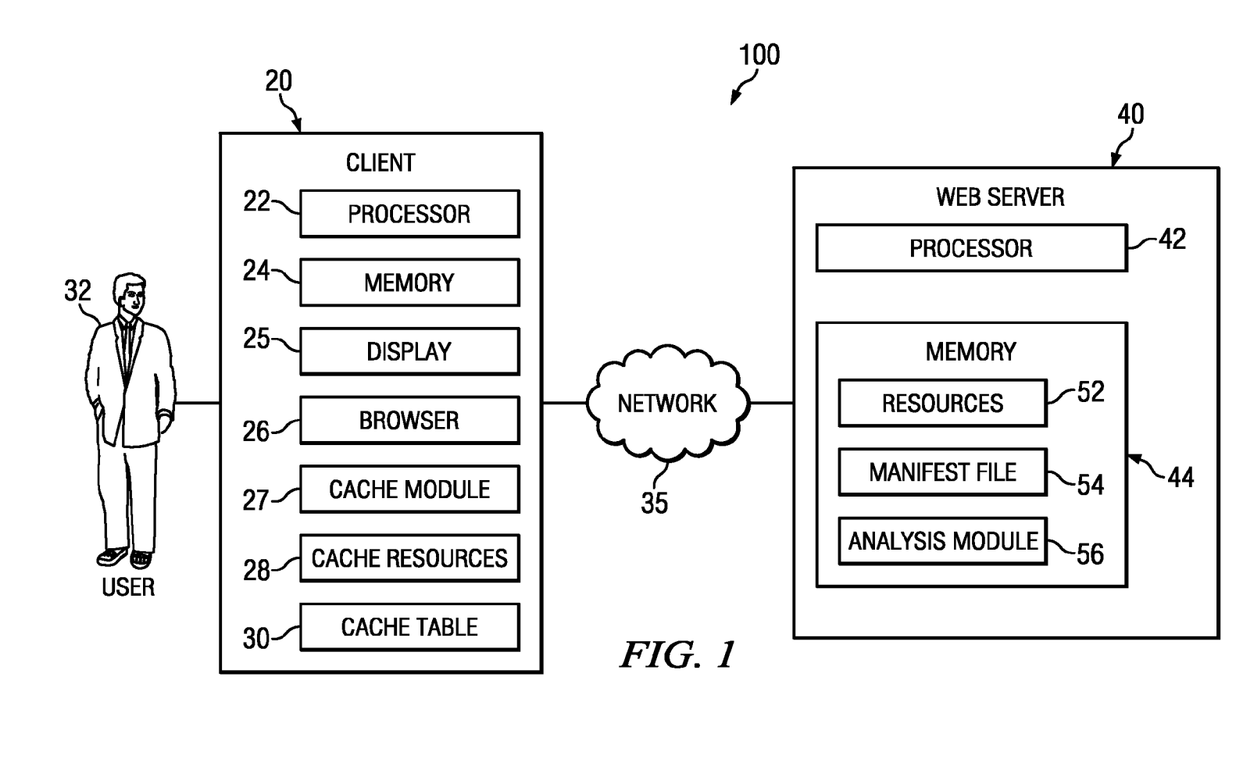
FIG. 1 illustrates an example system for redirecting a request for a non-canonical web page.

FIG. 1 illustrates an example system 100 for redirecting a request for a non-canonical web page. According to the illustrated embodiment, system 100 includes a web user 32, a client 20, a network 35, and a web server 40. Generally, client 20 may send a request for a non-canonical URL to web server 40. Web server 40 may send a redirect to client 20 to request the canonical URL, and send one or more instructions to the client to store the non-canonical URL and redirect to canonical URL in cache table 30. For subsequent requests made by client 20 for the non-canonical URL, client 20 may look up non-canonical URL in cache table 30 and redirect the non-canonical URL request to a canonical URL request without communicating with web server 40. Accordingly, assuming that the web resources 52 of the canonical URL are stored as cache resources 28, then the client may load the cache resources 28 associated with the redirect to the canonical URL without communicating with web server 40. For purposes of explanation, examples describing system 100 may generally be associated with redirecting a request for a web page. However, system 100 may be associated with redirecting requests for any web application (e.g., web page, image file, video file, or any other type of content).

As used herein, the canonical URL refers to the authoritative URL for a web page. An administrator of the web page may decide on the canonical URL. In some embodiments, the canonical URL may refer to the URL for a web page that is displayed in the results of a search engine. Web server 40 may be associated with several different URLs which refer to the same web page. A non-canonical URL or alias URL refers to all of the URLs which do not exactly match the canonical URL. For example, www.example.com/index.html may refer to the canonical URL and example.com, www.example.com, example.com/index.html?lang=EN, and example.com/index.html?token=345wrt754edf may refer to non-canonical or alias URLs. Typically web server 40 will redirect requests for alias URLs to the canonical URL. Canonical URLs and alias URLs are associated with the same web page and the same web resources 52.

Client 20 may represent a general or special-purpose computer capable of performing the described operations. For example, client 20 may include, but are not limited to, mobile devices; cell phones; laptop computers; desktop computers; end user devices; video monitors; cameras; personal digital assistants (PDAs); or any other communication hardware, software, and/or encoded logic that supports the communication of web pages, images, videos, text or other suitable forms of data. Additionally, in particular embodiments, client 20 may include one or more browsers 26 and/or one or more processors 20 operable to execute computer logic and/or software encoded on tangible media that perform the described functionality. Client 20 may include one or more input devices such as a keyboard, trackball, mouse, and/or one or more Graphical User Interfaces (GUIs) through which user 32 may interact with the applications running on client 20. Client 20 may include any appropriate combination of hardware, software, and/or encoded logic suitable to perform the described functionality. Client 20 may include memory 24. Client 20 may also include cache resources 28 and a cache table 30 to store web resources 52 received from web server 40. Client 30 may be communicatively coupled with web server 40, directly or indirectly, over network 35. System 100 may comprise any appropriate number and type of clients 20.

Client 30 may include any hardware and/or controlling logic used to communicate information to and from one or more elements illustrated in FIG. 1. For example, client 30 may be operable to receive and process data of different types that may be transmitted via different protocols or formats. Other elements in FIG. 1 may also comprise hardware and/or controlling logic to communicate information to and from one or more elements illustrated in FIG. 1. For example, elements in FIG. 1 may communicate with Hypertext Transfer Protocol (HTTP), which is a request-response protocol standard.

Processor 22 may represent and/or include any form of processing component, including general purpose computers, dedicated microprocessors, or other processing devices capable of processing electronic information. Examples of processor 22 include digital signal processors (DSPs), application-specific integrated circuits (ASICs), field-programmable gate arrays (FPGAs), and any other suitable specific or general purpose processors. Although FIG. 1 illustrates a single processor 22 in client 30, client 30 may include any suitable number of processors 22.

Memory 24 may store processor instructions, browser 26, information resources, and/or any other suitable information. Memory 24 may comprise any collection and arrangement of volatile and/or non-volatile components suitable for storing data. For example, memory 24 may comprise random access memory (RAM) devices, read only memory (ROM) devices, magnetic storage devices, optical storage devices, and/or any other suitable data storage devices. In particular embodiments, memory 24 may represent, in part, computer-readable storage media on which computer instructions and/or logic are encoded. In such embodiments, some or all the described functionality of the computer instructions and/or logic included in destination web page 56, which is described below, may be provided by processor 22 executing the instructions encoded on the described media. Although shown in FIG. 1 as a single component, memory 40 may represent any number of memory components within, local to, and/or accessible by processor 22 and browser 26. Although browser 26, cache resources 28, cache table 30, and cache module 31 are shown as separate from memory 24, these elements may be stored in memory 24. Although shown in FIG. 1 as a separate component from browser 26, client memory 24 may refer to the browser 26 cache.

Browser 26 may be a software application that is operable to request, process, and display one or more web resources 52 (e.g., a HyperText Markup Language ("HTML") document, a Cascading Style Sheet, an image file, a video file, JavaScript, etc.) associated with a URL. For example, user 32 may enter a particular URL (e.g., http://example.destinationwebpage.com) associated with a web page in the address bar of a navigation browser 26, which may cause browser 26 to request, process, and display the one or more web resources associated with the URL. Further, browser 26 may allow user 32 to interact with a web page that has been loaded in browser 26. For example, user 32 may enter authentication credentials (e.g., username, password, email address, etc.) in a web page that has been loaded in browser 26 to authenticate user 32 to the web site associated with the web page. Although browser 26 is typically intended to access the World Wide Web, browser 26 may also be used to access information located in private networks or in file systems. In some embodiments, browser 26 may have its own cache memory to store cache resources 28 and cache table 30.

Cache module 27 may determine if a requested URL and its associated cache resources 28 should be loaded from client memory 24 rather than requesting the URL and its associated web resources 52 from web server 40. Cache module 27 may use cache table 30 to store entries of URLs and their associated cache resources 28 that are to be loaded from client memory 24 in response to a request for the URLs stored in cache table 30. An embodiment of cache table 30 is illustrated in more detail below in FIG. 3. In some embodiments, cache module 27 may comprise HTML5 Application Cache. Cache module 27 represents any appropriate combination of logic and/or software suitable to perform the described functions.

Cache resources 28 may refer to the one or more web resources 52 associated with a requested URL that have been downloaded and stored in client memory 24. Cache resources 28 may be loaded from client memory 24 so that web resources 52 do not need to be downloaded for each URL request.

User 32 may interact with client 20 and/or browser 26. User 32 may be anyone or anything attempting to access a URL in system 100.

Network 35 may represent any form of communication network supporting circuit-switched, packet-based, and/or any other suitable type of communications. Network 35 may additionally include any other components of system 100 capable of transmitting and/or receiving information over a communication network, including client 20, authorization provider 40, and/or content provider 50. Although shown in FIG. 1 as a single element, network 35 may represent one or more separate networks (including all or parts of various different networks) that are separated and serve different respective elements illustrated in FIG. 1. Network 35 may include routers, hubs, switches, firewalls, content switches, gateways, call controllers, and/or any other suitable components in any suitable form or arrangement. Network 35 may include, in whole or in part, one or more secured and/or encrypted Virtual Private Networks (VPNs) operable to couple one or more network elements together by operating or communicating over elements of a public or external communication network. In general, network 35 may comprise any combination of public or private communication equipment such as elements of the public switched telephone network (PSTN), a global computer network such as the Internet, a local area network (LAN), a wide area network (WAN), or other appropriate communication equipment.

Web server 40 stores web resources 52 associated with each URL and determines how to respond to URL requests from client 40. Web server 40 may be any suitable computing device comprising a processor 42 and a memory 44. Web server 40 may also include web resources 52, manifest file 54, and analysis module 56 in memory 44. Web server 40 may comprise one or more machines, workstations, laptops, blade servers, server farms, and/or stand alone servers. Authorization provider 40 may be operable to communicate with client 20 in any suitable manner. For example, web server 40 may be operable to receive a request (e.g., an HTTP GET request) for a web page 46 and transmit web resources 52 to requestor.

Web resources 52 may refer to one or more resources (e.g., an HTML document, a Cascading Style Sheet, an image file, a video file, JavaScript, etc.) associated with a requested URL that are stored in memory 44 on web server 40. Web resources 52 may be transmitted to client 20 in response to the URL request from client 20.

Manifest file 54 may be any type of data that identifies each web resource 52 which is to be stored at client 20 as a cache resource 28 in cache table 30 for the entry associated with the requested URL. Accordingly, manifest file 54 may identify particular web resources 52 which should be stored as cache resources 28 and loaded from memory 24 at client 20 for subsequent requests by client for the requested URL. Manifest file 54 may also identify additional URLs associated with web resources 52 which are to be stored at client 20 as cache resources 28 in cache table 30. Accordingly, manifest file 54 may identify particular web resources 52 which should be stored as cache resources 28 and loaded from memory 24 at client 20 for subsequent requests by client for any of the requested URLs identified in manifest file 54. Manifest file 54 may be transmitted to client 20 in response to the URL request from client 20. An embodiment of manifest file 54 is illustrated in more detail below in FIG. 2. In alternative embodiments, HTTP cache headers may be used to instruct client 20 which web resources 52 to store as cache resources 28 in cache table 30 for the associated requested URL.

Analysis module 56 may determine if a URL request is for the canonical URL or an alias URL associated with web page. If the URL request for an alias URL, analysis module 56 may generate a redirect response to client 20 to request the canonical URL. In some embodiments, analysis module 56 may also generate a URL response that instructs client 20 to create a cache entry for the alias URL in cache table 30 at client 20 where the cache entry includes instructions to redirect a subsequent request for the alias URL to a request for the canonical URL. Accordingly, subsequent requests for this particular alias URL can be redirected to the canonical URL at client 20 without communicating over network 35 with web server 40.

Analysis module 56 may determine if an alias URL is likely to be used again. Analysis module 56 may determine that an alias URL is not likely to be used again if any of the query parameters in the URL include any data that is randomly generated for each subsequent URL request (e.g., data associated with an authentication token). Conversely, analysis module 56 may determine that an alias URL is likely to be used again if all of the query parameters in the URL include data that will remain static for each subsequent URL request (e.g., lang=EN). In some embodiments, analysis module 56 may only instruct client 20 to create a cache entry for the alias URL in cache table if the alias URL is likely to be used again. Analysis module 56 represents any appropriate combination of logic and/or software suitable to perform the described functions.

Client 20 and web server 40 may represent any appropriate combination of hardware and/or software suitable to perform the described functions. Some embodiments of the disclosure may include logic and/or software contained within a medium. The medium may include RAM, ROM, or disk drives. The medium may be non-transitory. In some embodiments, the logic and/or software may be contained within hardware configuration. The logic and/or software may also be embedded within any other suitable medium without departing from the scope of the disclosure. For example, analysis module 56 may be logic and/or software stored and encoded on tangible, computer-readable media and executed on processor 42 and/or other computer hardware suitable to instruct web server 40 to perform the described functions.

In operation, user 32 may enter URL in address bar of browser 26 or click on a bookmark associated with a particular URL. Client 20 may determine if the URL is in cache table 30. In some embodiments, the requested URL must be an exact match to a URL listed in cache table 30.

In some embodiments, if the requested URL is not in cache table 30, client 20 may send a URL request to web server 40. Web server 40 may determine if the requested URL is the canonical URL or an alias URL.

In some embodiments, if the requested URL is the canonical URL, web server 40 may determine if manifest file 54 is associated with the canonical URL. If the requested canonical URL has a manifest file 54 associated with the canonical URL, the flow diagram continues to step 420 when web server 40 may serve manifest file 54 to browser 26 stored on client 20.

In some embodiments, if the requested canonical URL does not have manifest file 54 associated with the canonical URL, web server 40 may serve client 20 with each of the web resources 52 associated with the canonical URL. Browser 26 may receive each of web resources 52 associated with the canonical URL and displays these web resources 52.

In some embodiments, if the requested canonical URL does have a manifest file 54 associated with the canonical URL, web server 40 may serve manifest file 54 to client 20. Web server 40 may serve each of web resources 52 associated with the requested canonical URL. Client 20 may store in client memory 24 each of the web resources 52 identified in the manifest file 54 as cache resources 28. Client 20 may store the canonical URL and its associated cache resources 28 as an entry in cache table 30. Browser 26 may receive each of web resources 52 associated with the canonical URL and display these web resources 52.

In some embodiments, web server 40 may determine if the alias URL is likely to be used again. Web server 40 may determine that an alias URL is not likely to be used again if any of the query parameters in the URL include any data that is randomly generated for each subsequent URL request (e.g., data associated with an authentication token). Conversely, web server 40 may determine that an alias URL is likely to be used again if all of the query parameters in the URL include data that will remain static for each subsequent URL request (e.g., lang=EN).

If the requested alias URL is not likely to be requested again, web server 40 may serve a redirect response to client to request the canonical URL. In some embodiments, the redirect response may be in the form of JavaScript. An example redirect response for a requested alias URL which is not likely to be requested again may be sent with an example 200 response code: <html><script> location=canonical URL+ (location.hash ? '#'+location.hash :")</script></html>. In this example, location represents a frame associated with browser 26, such that the script causes the frame to load the canonical URL. After the canonical URL and its associated cache resources 28 have been loaded from client memory 24, the hash value or other language stripped from the alias URL may be appended to the canonical URL in the address bar of browser 26. By serving a redirect response rather than serving each of the web resources 52 associated with, the present disclosure reduces network traffic because a redirect response is typically 100 bytes and the associated web resources 52 are typically at least 300 kilobytes. The redirect response may input the canonical URL in the address window of browser 26. Client 20 may determine if the requested canonical URL is in cache table 30.

In some embodiments, if the requested alias URL is likely to be requested again, web server 40 may serve a redirect response to client 20 to request the canonical URL. In some embodiments, the redirect response may be in the form of JavaScript. In some embodiments, the redirect response may be in the form of a meta tag. An example redirect response for a requested alias URL which is not likely to be requested again may be sent with an example 200 response code: <html manifest="URL of manifest file"><script> location=canonical URL+(location.hash ? '#'+location. hash :")</script></html>. In this example, location represents a frame associated with browser 26, such that the script causes the frame to load the canonical URL. After the canonical URL and its associated cache resources 28 have been loaded from client memory 24, the hash value or other language stripped from the alias URL may be appended to the canonical URL in the address bar of browser 26.

In some embodiments, web server 40 may also serve instructions to client 20 to store the requested alias URL and its associated client-side redirect to the canonical URL as an entry in cache table 30. Accordingly, web server 40 may send one or more instructions to client 20 to request the canonical URL for a subsequent request for the alias URL. In some embodiments, web server may send the one or more instructions only if the alias URL is likely to be requested again. Accordingly, subsequent requests for the alias URL will result in a hit in the cache table 30 and a client-side redirect to the canonical URL without having to communicate over network 35 with web server 40. The redirect response may atomically input the canonical URL in the address window of browser 26 in response to the redirect to the canonical URL received from web server 40. Next, client 20 may determine if the requested canonical URL is in cache table 30.

In some embodiments, if the requested URL is in cache table 30, client 20 may determine if a client-side redirect to the canonical URL is associated with the requested URL in cache table 30. If a client-side redirect to the canonical URL is associated with the requested URL in cache table 30, client 20 may automatically input the canonical URL in the address window of browser 26 in response to the client-side redirect to the canonical URL received from cache table 30. In some embodiments, the client-side redirect response may be in the form of JavaScript. In some embodiments, the client-side redirect response may be in the form of a meta tag. Next, client 20 may determine if the requested canonical URL is in cache table 30.

If a client-side redirect to the canonical URL is not associated with the requested URL in cache table 30, client 20 may automatically load from client memory 24 all cache resources 28 associated with the requested URL in cache table 30. Next, browser 26 may display each of the cache resources 28 associated with the requested URL.

Accordingly, a request for an alias URL, which is stored in cache table 30, may be redirected by client 20 to request the canonical URL. The request for the canonical URL, which is stored in cache table 30, serves the associated cached resources from client memory 24. Thus, requests for alias URLs may result in displaying the desired web page and its associated resources without having to communicate across network 35 with web server 40. By utilizing client-side redirects of alias URLs to canonical URLs, the present disclosure maximizes cache hits of the resources associated with the canonical URL and alias URLs without having to download separate instances of each resource associated with each alias URL. Thus, in some embodiments, only one instance of each resource associated with a web page needs to be stored in client memory 24 even if the web page has multiple alias URLs. As a result, the user experience is greatly improved, especially for users of mobile clients, by reducing the load time associated with an alias URL request because the client-side redirect to the canonical URL and the retrieval of cache resources 28 associated with the alias URL from client memory 24 may occur without having to communicate across network 35 with web server 40. Thus, browser 26 may load an alias URL even if the client is not connected to network 35.

Figure 2:
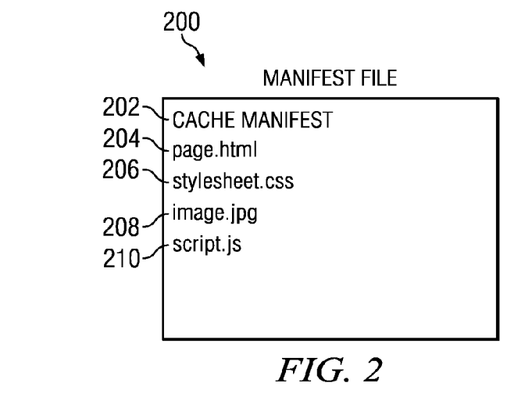
FIG. 2 illustrates an example manifest file which lists the web resources to be stored in client memory.

FIG. 2 illustrates an example manifest file 200 which lists the web resources 52 to be stored in client memory 24. In the example manifest file 200, the heading CACHE MANIFEST 202 may indicate to client that all web resources under this heading are to be downloaded by client 20 and stored as cache resources 28 in cache table 30. Accordingly, manifest file 200 indicates that example web resources page.html 204, stylesheet.css 206, image.jpg 208, and script.js 210 are to be downloaded by client 20 and stored as cache resources 28 in cache table 30.

Figure 3:
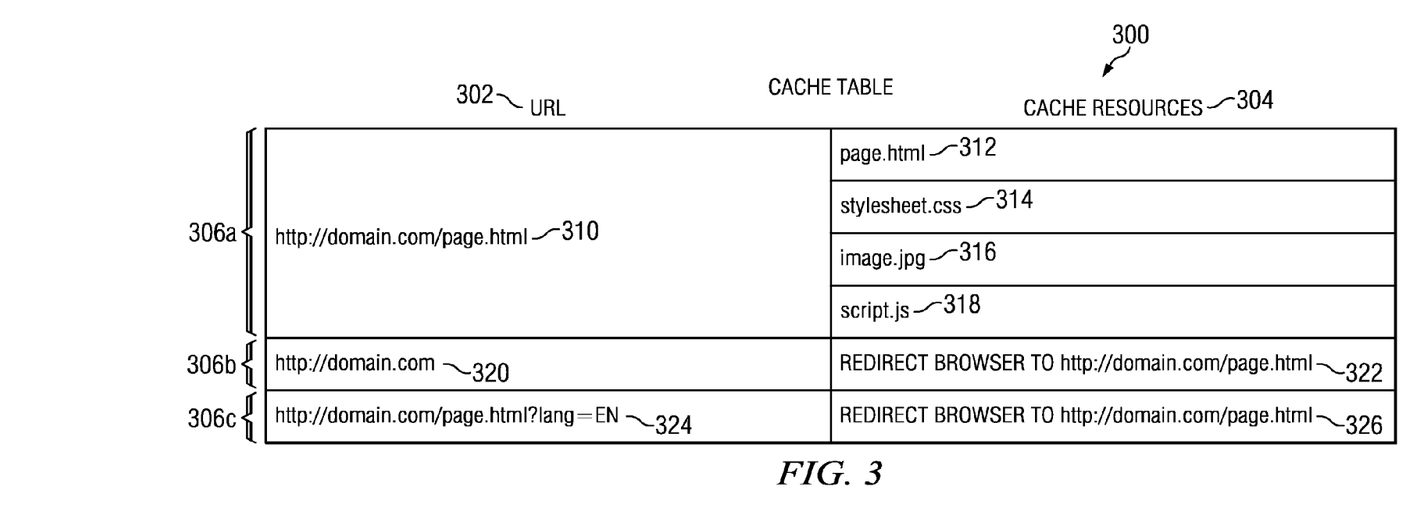
FIG. 3 illustrates an example cache table for storing entries of canonical URLs and non-canonical URLs and their associated cache resources.

FIG. 3 illustrates an example cache table 300 for storing entries of canonical URLs 310 and non-canonical URLs 320, 324 and their associated cache resources 304. Example cache table 300 is illustrated having a first column 302 of example URL requests 310, 320, 324 and a second column 304 of cache resources 312, 314, 316, 318, 322, 326 associated with each particular example URL request. Each entry in example cache table 300 is illustrated by the rows 306a, 306b, and 306c.

In an example entry for row 306a, the example canonical URL http://domain.com/page.html 310 is associated with example cache resources page.html 312, stylesheet.css 314, image.jpg 316, and script.js 318. Accordingly, any request for the canonical URL 310 or alias URL redirect response to request the canonical URL 310 that results in an exact match to the canonical URL 310 stored at entry 306a will cause the associated example cache resources page.html 312, stylesheet.css 314, image.jpg 316, and script.js 318 to be loaded by browser 26 from client memory 24.

In an example entry for row 306b, the example alias URL http://domain.com 320 is associated with an example cache resource for a client-side redirect 322 to request the canonical URL at http://domain.com/page.html 310. Accordingly, any request for the alias URL 320 that results in an exact match to the alias URL 320 stored at entry 306b will cause the associated client-side redirect 322 to be loaded by browser 26 from client memory 24.

In an example entry for row 306c, the example alias URL http://domain.com/page.html?lang=EN 324 is associated with an example cache resource for a client-side redirect 326 to request the canonical URL at http://domain.com/page.html 310. Accordingly, any request for the alias URL 324 that results in an exact match to the alias URL 324 stored at entry 306c will cause the associated client-side redirect 326 to be loaded by browser 26 from client memory 24.

Figure 4:
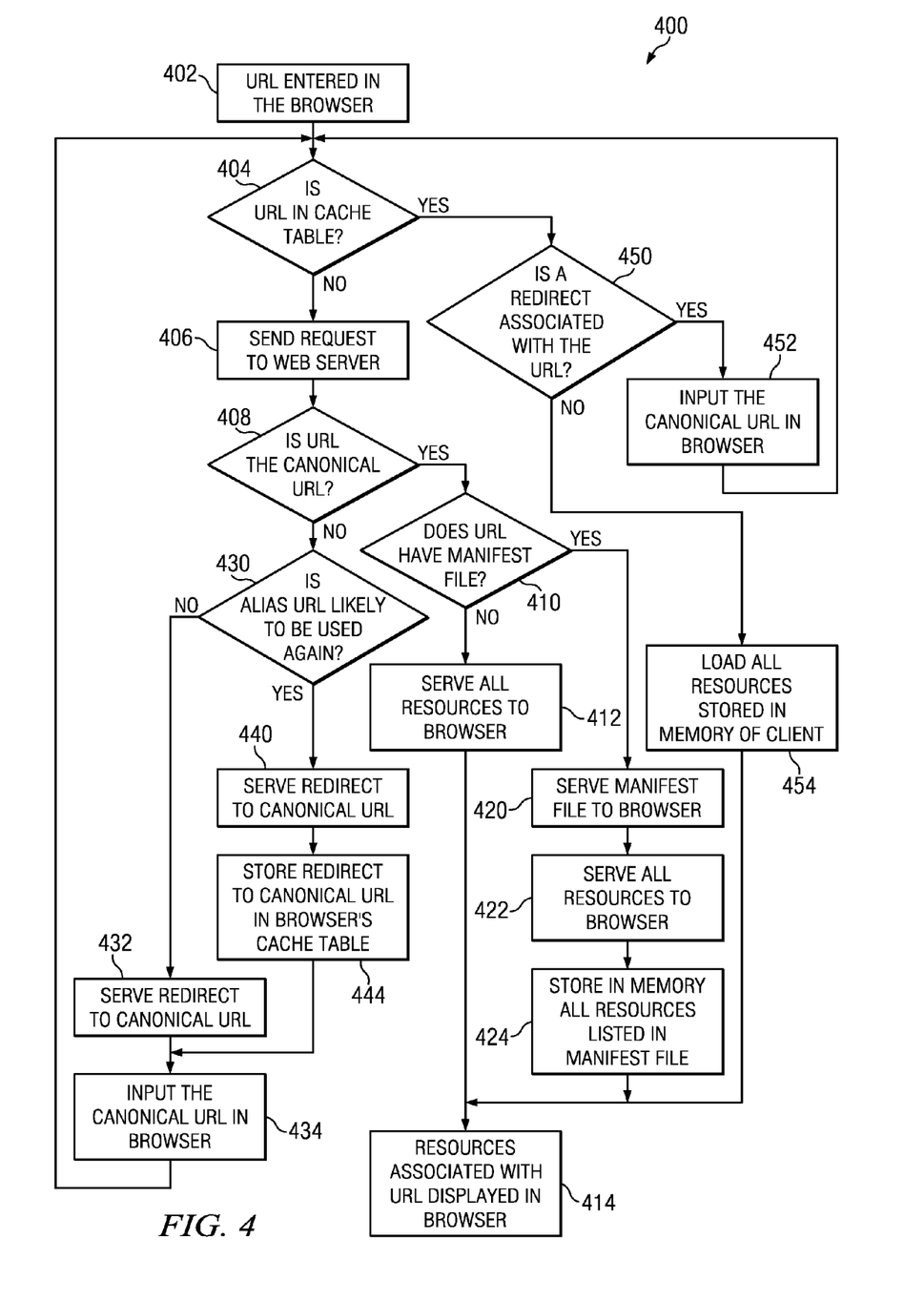
FIG. 4 illustrates a flow diagram of an embodiment for redirecting a request for a non-canonical web page, according to certain embodiments.

FIG. 4 illustrates a flow diagram of an embodiment for redirecting a request for a non-canonical web page, according to certain embodiments. In the illustrated example, flow diagram 400 begins at step 402 when user 32 enters URL in browser 26. At step 404, client 20 may determine if the URL is in cache table 30. In some embodiments, the requested URL must be an exact match to a URL listed in cache table 30. If the requested URL is in cache table 30, the flow diagram continues to step 450 where client 20 may determine if a redirect is associated with the requested URL in cache table 30.

If the requested URL is not in cache table 30, the flow diagram continues to step 406 where client 20 may send a URL request to web server 40. At step 408, web server 40 may determine if the requested URL is the canonical URL or an alias URL. If the requested URL is an alias URL, the flow diagram continues to step 430 where web server 40 may determine if the alias URL is likely to be used again.

If the requested URL is the canonical URL, the flow diagram continues to step 410 where web server 40 may determine if a manifest file 54 is associated with the canonical URL. If the requested canonical URL has a manifest file 54 associated with the canonical URL, the flow diagram continues to step 420 when web server 40 may serve manifest file 54 to browser 26 stored on client 20.

If the requested canonical URL does not have a manifest file 54 associated with the canonical URL, the flow diagram continues to step 412 where web server 40 serves to browser 26 stored on client 20 each of the web resources 52 associated with the canonical URL. At step 414, browser 26 receives each of the web resources 52 associated with the canonical URL and displays these web resources 52.

Returning to step 420, web server 40 may serve the manifest file 54 to browser 26 stored on client 20. At step 422, web server 40 may serve each of the web resources 52 associated with the requested canonical URL. At step 424, client 20 may store in client memory 24 each of the web resources 52 identified in the manifest file 54 as cache resources 28. Client 20 may store the canonical URL and its associated cache resources 28 as an entry in cache table 30. At step 414, browser 26 receives each of the web resources 52 associated with the canonical URL and displays these web resources 52.

Returning to step 430, web server 40 may determine if the alias URL is likely to be used again. Web server 40 may determine that an alias URL is not likely to be used again if any of the query parameters in the URL include any data that is randomly generated for each subsequent URL request (e.g., data associated with an authentication token). Conversely, web server 40 may determine that an alias URL is likely to be used again if all of the query parameters in the URL include data that will remain static for each subsequent URL request (e.g., lang=EN).

If the requested alias URL is not likely to be requested again, the flow diagram continues to step 432 where web server 40 serves a redirect response to client to request the canonical URL. In some embodiments, the redirect response may be in the form of JavaScript. An example redirect response for a requested alias URL which is not likely to be requested again may be sent with a 200 response code: <html><script> location=canonical URL+(location.hash ? '#'+location.hash :")</script></html>. In this example, location represents a frame associated with browser 26, such that the script causes the frame to load the canonical URL. In certain embodiments, after the canonical URL and its associated cache resources 28 have been loaded from client memory 24, the hash value or other language stripped from the alias URL may be appended to the canonical URL in the address bar of browser 26. By serving a redirect response rather than serving each of the web resources 52 associated with, the present disclosure reduces network traffic because a redirect response is typically 100 bytes and the associated web resources 52 are typically at least 300 kilobytes.

At step 434, the redirect response may input the canonical URL in the address window of browser 26. The flow diagram continues back to step 404 where client 20 may determine if the requested canonical URL is in cache table 30.

If the requested alias URL is likely to be requested again, the flow diagram continues to step 440 where web server 40 serves a redirect response to client to request the canonical URL. In some embodiments, the redirect response may be in the form of JavaScript. In some embodiments, the redirect response may be in the form of a meta tag. An example redirect response for a requested alias URL which is not likely to be requested again may be sent with a 200 response code: <html manifest="URL of manifest file"><script> location=canonical URL+(location.hash ? '#'+location.hash :")</script></html>. In this example, location represents a frame associated with browser 26, such that the script causes the frame to load the canonical URL. In certain embodiments, after the canonical URL and its associated cache resources 28 have been loaded from client memory 24, the hash value or other language stripped from the alias URL may be appended to the canonical URL in the address bar of browser 26.

At step 444, web server 40 may also serve instructions to client 20 to store the requested alias URL and its associated redirect to the canonical URL as an entry in cache table 30. Accordingly, subsequent requests for the alias URL will result in a hit in the cache table 30 and a client-side redirect to the canonical URL without having to communicate over network 35 with web server 40. At step 434, the redirect response may atomically input the canonical URL in the address window of browser 26 in response to the redirect to the canonical URL received from web server 40. The flow diagram continues back to step 404 where client 20 may determine if the requested canonical URL is in cache table 30.

Returning to step 450, where if the requested URL is in cache table 30, client 20 may determine if a client-side redirect to the canonical URL is associated with the requested URL in cache table 30. If a client-side redirect to the canonical URL is associated with the requested URL in cache table 30, the flow diagram continues to step 452 where client 20 may automatically input the canonical URL in the address window of browser 26 in response to the client-side redirect to the canonical URL received from cache table 30. In some embodiments, the client-side redirect response may be in the form of JavaScript. In some embodiments, the client-side redirect response may be in the form of a meta tag. The flow diagram continues back to step 404 where client 20 may determine if the requested canonical URL is in cache table 30.

If a client-side redirect to the canonical URL is not associated with the requested URL in cache table 30, the flow diagram continues to step 454 where client 20 may automatically load from client memory 24 all cache resources 28 associated with the requested URL in cache table 30. At step 414, browser 26 displays each of the cache resources 28 associated with the requested URL.

Accordingly, a request for an alias URL, which is stored in cache table 30, may be redirected by client 20 to request the canonical URL. The request for the canonical URL, which is stored in cache table 30, serves the associated cached resources from client memory 24. Thus, requests for alias URLs may result in displaying the desired web page and its associated resources without having to communicate across network 35 with web server 40. By utilizing client-side redirects of alias URLs to canonical URLs, the present disclosure maximizes cache hits of the resources associated with the canonical URL and alias URLs without having to download separate instances of each resource associated with each alias URL. Thus, in some embodiments, only one instance of each resource associated with a web page needs to be stored in client memory 24 even if the web page has multiple alias URLs. As a result, the user experience is greatly improved, especially for users of mobile clients, by reducing the load time associated with an alias URL request because the client-side redirect to the canonical URL and the retrieval of cache resources 28 associated with the alias URL from client memory 24 may occur without having to communicate across network 35 with web server 40. Thus, browser 26 may load an alias URL even if the client is not connected to network 35.

The steps illustrated in FIG. 4 may be combined, modified, or deleted where appropriate, and additional steps may also be added to those shown. Additionally, the steps may be performed in any suitable order without departing from the scope of the present disclosure.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Neither is the "Summary" to be considered as a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method of redirecting a request for a non-canonical web page, the method comprising:
   receiving a request, from a client, for an alias Uniform Resource Locator ("URL") at a web server, wherein an address for the alias URL is different than an address for a canonical URL, wherein the alias URL and the canonical URL are associated with the same web resources;
   determining, by the web server, that the alias URL is associated with the canonical URL;
   sending, by the web server, a redirect to the client to request the canonical URL; and
   sending, by the web server, one or more instructions to the client to request the canonical URL for a subsequent request for the alias URL.

2. A method according to claim 1, further comprising:
   determining if the alias URL is likely to be requested again; and
   sending the one or more instructions only if the alias URL is likely to be requested again.

3. A method according to claim 2, wherein the alias URL is likely to be requested again if the alias URL does not include a query parameter with a random value.

4. A method according to claim 1, wherein the one or more instructions comprise an instruction to store an entry of the alias URL and the redirect to the canonical URL in a cache table, wherein the cache table stores an entry for one or more resources associated with the canonical URL.

5. A method according to claim 1, wherein the one or more instructions allows the client, in response to subsequently requesting the alias URL, to load the one or more web resources associated with the canonical URL from client memory without communicating with the web server.

6. A method according to claim 5, wherein the redirect comprises JavaScript.

7. A method according to claim 1, wherein the client comprises a browser.

8. A method according to claim 1, wherein the one or more instructions are stored in a manifest file.

9. A method according to claim 1, wherein the one or more web resources comprise at least one selected from the group consisting of:
   an HyperText Markup Language ("HTML") document;
   a Cascading Style Sheet ("CSS");
   an image file; and
   JavaScript.

10. Logic for redirecting a request for a non-canonical web page, the logic being embodied in a computer-readable medium and when executed operable to:
    receive a request, from a client, for an alias Uniform Resource Locator ("URL") at a web server, wherein an address for the alias URL is different than an address for a canonical URL, wherein the alias URL and the canonical URL are associated with the same web resources;

determine, at the web server, that the alias URL is associated with the canonical URL;

send, from the web server, a redirect to the client to request the canonical URL; and send, from the web server, one or more instructions to the client to request the canonical URL for a subsequent request for the alias URL.

11. The logic according to claim 10, wherein the logic is further operable to:

determine if the alias URL is likely to be requested again; and send the one or more instructions only if the alias URL is likely to be requested again.

12. The logic according to claim 11, wherein the alias URL is likely to be requested again if the alias URL does not include a query parameter with a random value.

13. The logic according to claim 10, wherein the one or more instructions comprise an instruction to store an entry of the alias URL and the redirect to the canonical URL in a cache table, wherein the cache table stores an entry for one or more resources associated with the canonical URL.

14. The logic according to claim 10, wherein the one or more instructions allows the client, in response to subsequently requesting the alias URL, to load the one or more web resources associated with the canonical URL from client memory without communicating with the web server.

15. The logic according to claim 10, wherein the redirect comprises JavaScript.

16. The logic according to claim 10, wherein the client comprises a browser.

17. The logic according to claim 10, wherein the one or more instructions are stored in a manifest file.

18. The logic according to claim 10, wherein the one or more web resources comprise at least one selected from the group consisting of:

an HyperText Markup Language ("HTML") document;
a Cascading Style Sheet ("CSS");
an image file; and
JavaScript.

19. A system for redirecting a request for a non-canonical web page, the system comprising a web server operable to:

receive a request, from a client, for an alias Uniform Resource Locator ("URL"), wherein an address for the alias URL is different than an address for a canonical URL, wherein the alias URL and the canonical URL are associated with the same web resources;

determining, by the web server, that the alias URL is associated with the canonical URL;

send, by the web server, a redirect to the client to request the canonical URL; and send, by the web server, one or more instructions to the client to request the canonical URL for a subsequent request for the alias URL.

20. The system according to claim 19, wherein the web server is further operable to:

determine if the alias URL is likely to be requested again; and send the one or more instructions only if the alias URL is likely to be requested again.

21. The system according to claim 20, wherein the alias URL is likely to be requested again if the alias URL does not include a query parameter with a random value.

22. The system according to claim 19, wherein the one or more instructions comprise an instruction to store an entry of the alias URL and the redirect to the canonical URL in a cache table, wherein the cache table stores an entry for one or more resources associated with the canonical URL.

23. The system according to claim 19, wherein the one or more instructions allows the client, in response to subsequently requesting the alias URL, to load the one or more web resources associated with the canonical URL from client memory without communicating with the web server.

24. The system according to claim 19, wherein the redirect comprises JavaScript.

25. The system according to claim 19, wherein the client comprises a browser.

26. The system according to claim 19, wherein the one or more instructions are stored in a manifest file.

27. The system according to claim 19, wherein the one or more web resources comprise at least one selected from the group consisting of:

an HyperText Markup Language ("HTML") document;
a Cascading Style Sheet ("CSS");
an image file; and
JavaScript.

* * * * *